United States Patent [19]

Golovoy

[11] 4,028,326

[45] June 7, 1977

[54] PROCESS FOR PRODUCING POWDER PAINT PARTICLES FROM LIQUID PAINT I

[75] Inventor: Amos Golovoy, Inkster, Mich.

[73] Assignee: Ford Motor Company, Dearborn, Mich.

[22] Filed: Sept. 25, 1975

[21] Appl. No.: 616,526

[52] U.S. Cl. .......................... 260/42.22; 260/34.2; 260/42.21; 260/42.55; 260/830 TN; 260/836; 528/499

[51] Int. Cl.$^2$ ......................................... C08J 3/12

[58] Field of Search ............. 260/34.2, 42.55, 836, 260/42.22, 42.21; 428/499

[56] References Cited

UNITED STATES PATENTS

| | | | |
|---|---|---|---|
| 3,737,401 | 6/1973 | Tsou et al. ..................... | 260/34.2 |
| 3,879,335 | 4/1975 | Storck .............................. | 260/34.2 |
| 3,888,945 | 6/1975 | Arndt .............................. | 260/34.2 |

Primary Examiner—James H. Derrington
Attorney, Agent, or Firm—Olin B. Johnson; Keith L. Zerschling

[57] ABSTRACT

A process for producing powder paint particles, particularly metal-flakes containing powder paint particles, which comprises contacting the exposed surface of a stream of water in continuous movement through a spreading and extraction zone into a collection zone with a liquid dispersion of an organic paint binder and metal flakes in an organic solvent miscible with water wherein the organic paint binder is essentially insoluble in water and floats on the surface for a time sufficient to admit of its spreading on such surface, extraction of organic solvent from the floating liquid paint dispersion into the water, and solidification of the paint binder on such surface into plate-like solids containing said metal flakes within said spreading and extraction zone, and movement of the saline solution and floating plate-like solids into said collection zone wherein the plate-like solids are broken into smaller particles and recovered. In the preferred embodiment, the plate-like solids pass with the saline solution into a collection zone wherein breaking up of the plate-like solids, is, at least in part, effected by agitation of the water. In the preferred embodiment, the liquid dispersion is applied to the surface of the water in discreet droplets. The paint binder-coated metal flakes and particles which do not contain metal flakes are both suitable for use in powder paints.

5 Claims, No Drawings

PROCESS FOR PRODUCING POWDER PAINT PARTICLES FROM LIQUID PAINT I

This invention is concerned with improved methods for producing coatings containing metal flakes, to paints for producing such coatings, and to a process for producing improved coated flakes for use in such paints. Coatings containing metal flakes and paints used to produce such coatings are hereinafter referred to as "metallic coatings" and "metallic paints" respectively.

BACKGROUND OF THE INVENTION

Several methods for manufacturing powder coatings have been reported in trade publications and in the patent literature. Among these are melt mixing, spray drying, and coagulation. Microscopic examinations of powders produced by these techniques show that the shape of the particles thus produced is such that no dimension thereof is significantly dominant. Spray drying and coagulation both tend to yield, in predominant fraction, smooth, substantially round, powder particles. By way of contrast, melt mixing tends to yield, in predominant fraction, particles having sharp edges. While all of these methods are relatively suitable for the production of powder coatings which do not contain metal flakes as one of the particulate pigments, they have been found generally unsuitable for the production of powder coatings which do contain metal flakes. This unsuitability is manifest by an improper orientation of the metal flakes when such paints are applied to the substrate by electrostatic spray techniques, the most common method of applying automobile finish coatings.

In liquid metallic paints, the orientation of the metal flakes is primarily parallel with the surface of the coating film or tilted so as to form a small angle with such surface. While the orientation of a particular flake may form an angle with the surface of the film, it is an essential characteristic of a good metallic coating that the net orientation of all such flakes be essentially parallel to such surface.

When the methods above mentioned are used to prepare resin coated metal flakes for use in powder paints they yield resin particles in which the metal flakes within a particle are oriented randomly. When such a powder is applied to a substrate and baked to form a coating, the orientation of the metal flakes in the film is influenced by the direction of flow of the powder during baking. For example, when a powder coated surface is baked vertically there is a net flow of the coating downward and parallel to the surface. Consequently, a large fraction of the metal flakes is oriented in a downward angle to the horizontal, thereby producing a coating in which the brightness varies substantially with the angle of observation. In particular, the coating is much brighter when observed with the direction of flow than it is when observed opposite the direction of flow, an undesirable phenomenon, known in the trade as "reverse flop". On the other hand, when a powder coated surface is baked in horizontal alignment there is no net bulk flow parallel to the surface and the orientation of a fraction of the metal flakes in the coating remains perpendicular to the surface of the coating film. Since that fraction does not reflect light, the brightness of the coating is much less than that of a corresponding liquid metallic paint or a powder metallic paint that has been baked in vertical alignment.

Metal flakes are almost always employed in combination with non-metal, pigment and together they impart a colored metallic appearance to an automobile body or other article painted. Since the orientation of the metal flakes also influences the color development, or hue, of the coating, there is a noticeable difference in that respect between horizontally and vertically baked powder coated surfaces of the prior art. In addition, the metal flakes, which are oriented perpendicular to the surface of the coating film, tend to protrude through the surface of the coating, thereby reducing gloss. Consequently, the gloss of horizontally baked surfaces of such prior art is lower than that of corresponding vertically baked surfaces.

A method for producing powder paint which involves release of a liquid paint formulation into water is disclosed in U.S. Pat. No. 3,737,401 to I. H. Tsou. Three methods are disclosed by this patent. In the first, the liquid paint is agitated in a container into which is rapidly poured a large amount of coagulating liquid. This is continued until coagulation of the non-solvent (i.e., film-forming) portion of the paint is completed. The patentee states therein that this method is suited to batch processing and that it is difficult to control the sizes of powder particles resulting from this method. The second method disclosed is to agitate a container of the coagulating liquid and slowly pour the prepared paint into the agitated second liquid. The patentee states therein that this method is suited to batch processing, produces a somewhat narrower range of powder particle sizes than the first method, and that it is difficult to control particle size using this method. The third method, patentee's preferred embodiment, is suited to continuous production and permits a greater control over particle size and particle size distribution. In this method, the liquid paint is introduced into the coagulating liquid beneath the surface of the coagulating liquid near the mixer blade where the agitation of the coagulating medium is at a maximum. Thus, all of these methods contemplate intermixing of the paint solution and the coagulating liquid under conditions of agitation and the preferred and most effective method calls for introducing the liquid paint at the point of highest agitation. The powder paint particles thus formed from minute drops of liquid introduced into high turbulence inherently tend toward the spherical shape. If these particles contain metal flakes, the orientation of such flakes is inherently random.

THE INVENTION

It now has been discovered that the difference in brightness, gloss and color development between vertically baked and horizontally baked powder metallic coatings can be substantially minimized, and in some cases eliminated, by using in the powder paint powder particles consisting essentially of resin-coated metal flakes of specific shape and in which the metal flakes, within each such particle, are unidirectionally oriented. The shape of the powder particles containing the metal flakes in accordance with this invention is such that one dimension is much smaller than the other two, i.e., each such powder flake is shaped like a disc or plate and the orientation of the metal flakes embedded in the powder flake is essentially parallel to the major surface of the powder flake. When such a powder metallic paint is supplied electrostatically to a substrate and baked, the net orientation of the metal flakes within the resultant film is essentially parallel to the surface of the film regardless of substrate orientation during baking.

The coated metal flakes of this invention are prepared by a novel process which may be referred to as a simultaneous spreading and extraction process. In accordance with this process, a paint resin system is prepared in solution with a low-surface-tension organic solvent (about 20 to about 40, preferably 20 to 35, dynes/cm) that is miscible with water. This solution contains all of the ingredients of the intended powder coating composition, e.g., resin, flow control agent, crosslinking agent, non-metal pigment and metal flakes. Suitable solvents include acetone, water-miscible alcohols, and p-dioxane. The solution surface tension is essentially the same as that of the organic solvent with minor variation resulting from the solid content of the solution.

This paint dispersion is caused to contact the surface of the moving stream of water which is advisedly as flat and free of turbulence as is practicable. Such contact is made in a spreading and extraction zone, and preferably with the paint solution in the form of discreet droplets. These drops of paint dispersion float on the water for a time sufficient to spread, for the solvent to be extracted into the water, and for the floating paint to solidify into plate-like solids. The moving stream then goes to a collection zone, the plate-like solids are broken into smaller particles and these particles are collected, washed, dried and used in powder paints.

Powder paints may contain from about 0.5 to 50 weight percent metal particles based on the weight of total film-former. The metal flake-containing powder particles ordinarily comprise substantially less than half of the powder particles employed in a coating and may not be present at all as many powder coatings are not pigmented with metal flakes. Thin, flat, or plate-like powder paint particles without metal flakes also can be produced by this process.

DETAILED DESCRIPTION OF THE INVENTION

The dimensions of the metal flake containing powder particles of this invention may vary in the range of about 5 to about 140 microns along the X and Y axes of the two opposite major surfaces while the thickness of the powder particle or flake is not greater than the smaller of 15 microns and one-fifth of the dimension of the smaller of the X and Y measurements of the major surfaces and is advantageously in the range of about 1 to about 10 microns.

The size of the most desirable metal flake is such that 99% thereof pass through a 270 mesh screen. Suitable metal flakes include aluminum, nickel, copper, bronze, and stainless steel. Aluminum flakes are most commonly used.

In the preferred embodiment, the water is pumped through an open duct and into a spreading area and thence into a collecting tank which is equipped with agitation means, e.g., a stirrer, which creates high turbulence in the water and causes the thin, plate-like solids to fragment. The rate of flow through the open duct is such that the water surface is relatively smooth and undisturbed. The Reynolds Number for the flowing stream should be below 2,000 (an explanation of "Reynolds Number" is to be found in standard texts, for example, Transport Phenomena by Bird, Stewart and Lightfoot, John Wiley & Sons, New York, London, Sydney (1960) at page 41 and Mechanics of Fluid Flow by Longwell, McGraw-Hill Book Company (1966) at pages 58–59). The surface tension of the water is substantially greater than that of the paint dispersion and depending on the concentration of normal impurities in tap water will be in a narrow range of about 70 to about 73 dynes/cm. This water used for flotation and extraction in this process contains less than one weight percent contaminants.

Discrete droplets, e.g., 0.5 – 3 mm. diameter, or a continuous stream of the paint dispersion are dropped onto the surface of moving water. As a result of the large difference in the surface tensions of the water and of the paint dispersion, each drop immediately spreads on the water surface to form a thin plate-like film. While spreading occurs, the organic solvent is extracted into the salt water thereby yielding solid film. The rapid spreading of the drop causes the metal flakes to become oriented in a direction parallel to the formed solid film. The thickness of the plate-like film is in the range of about 1 to about 10 microns and advantageously has a major side diameter in the range of about 1 to about 4 cm. when the paint solution is applied to the surface of the water in discreet droplets. The solid, plate-like films move with the water to a collecting tank where agitation takes place to break up the fragile films and extract additional solvent. The solid paint films are then filtered, washed in fresh water, or with a solution of salt in water and then with water to remove salt and traces of solvent, and dried. The dried solid paint is then pulverized to pass through a 140 mesh screen. The thus produced powder particle containing metal flakes are then ready for admixture with a powder paint composition. Oversized particles may be repulverized while fines may be redissolved and reprocessed. These metal-containing, flat, solid, paint films can also be formed by spraying the paint solution onto a falling water curtain, or a moving belt or rotating roll wetted with a thin layer of water.

It has been found that there are certain important limitations on the above-described process. First, the concentration of the liquid paint solution should be between 10 and 40, preferably between 15 and 35 weight percent paint solids. When the paint solids in the solution exceeds 40%, the drops do not spread well, the metallic flakes do not become properly oriented, and solvent extraction is slow. When a concentration of below 15 weight percent solids is used, spreading is too rapid and the films disintegrate resulting in resinfree metallic suspended in the water. Second, the paint formulation must be insoluble or insignificantly insoluble, i.e., less than five (5) and preferably less than three (3) percent soluble in water. This process is suitable for use with resins having molecular weight in the range of about 1500 to about 15,000, preferably between about 1500 and about 8,500. Third, for proper spreading, the water surface should be relatively undisturbed. When the initial water contact is agitated strongly, the drops of liquid paint do not spread properly and round particles are formed in which the metal flakes are oriented randomly. The drops should be maintained in said extraction zone for a time sufficient to admit of extraction of at least 90, and preferably at least 97, weight percent of the organic solvent therefrom.

This invention will be more fully understood from the following illustrative examples:

EXAMPLE 1

A. Preparation of Powder Paint Solution

An epoxy-functional acrylic copolymer of vinyl monomer is prepared as follows:

The monomers, glycidyl methacrylate 8% by weight, methyl methacrylate 52% by weight and butyl methacrylate 40% by weight and mixed together. Three weight percent of a reaction initiator 2,2'-azobis-(2-methylpropionitrile) (AIBN) is dissolved in the monomer mixture. The mixture is slowly added to refluxing p-dioxane which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109° – 112° C.) with only a small fraction of the heat supplied from an external heater. After the addition of the monomer mixture is complete, the refluxing is maintained by an external heat source for three additional hours. The copolymer is separated from the reaction solution, dried and pulverized by a blender to pass through a 100 mesh screen.

A carboxy-terminatd polymer is prepared as follows:

One hundred ninety-five grams of a commercially available epoxy resin, i.e., a diepoxide having an epoxide equivalent of 650, is charged into a stainless steel beaker having a heating mantle. The epoxy resin is heated until it has melted. As the liquid epoxy resin is stirred, 60 grams of azelaic acid and 0.5 grams of tetrabutylammonium iodide is added. The time of addition is 30 minutes and the stirring is maintained so that a homogeneous mixture is obtained. This mixture is then heated to 150° C. for one (1) hour. The resin mixture is poured into an aluminum pan and cooled. The solid carboxy-terminated epoxy ester is pulverized by a blender to pass through a 100 mesh screen. A portion of this carboxyterminated polymer is weighed out for making a powder coating.

One-hundred parts by weight of the epoxy-functional copolymer powder are mixed with the following materials:

|  | Parts by Weight |
|---|---|
| carboxy terminated polymer | 43 |
| tetrabutyl ammonium bromide | 0.2 |
| polylauryl acrylate ($M_n$) = 10,000 | 0.5 |
| phthalo blue | 5.0 |
| p-dioxane | 350 |
| methanol | 50 |

A homogeneous liquid paint mixture is obtained by ball milling the above ingredients for 2 hours. Two and five tenths (2.5) parts of dry aluminum flakes that pass 325 mesh screen are combined with the liquid paint mixture under low shear agitation so as to disperse the aluminum uniformly in the thermosettable liquid paint without damage to the aluminum flakes.

B. Preparation of Flaky Powder Coating

Water is pumped through an open duct and into a holding tank equipped with a stirrer. The rate of water flow through the duct is such that the water surface is relatively flat. The thermosettable liquid paint is added dropwise to the water surface. The drops, approximately 2 mm. in diameter, spread rapidly to form thin solid plate-like films, approximately 2 cm. in diameter. The aluminum is distributed uniformly and parallel to the solid films.

The plate-like solid films are carried on the water surface to the holding tank where rapid agitation takes place. The rapid agitation effects break down of the fragile films to small powder coating flakes without damage to the aluminum, and enhances additional extraction of solvents from the powder flakes. The powder is filtered, washed in fresh water to remove traces of solvents, and dried. The dried powder is sieved through 140 mesh screen. Oversized powder flakes, which are fragile, are pulverized gently to pass through a 140 mesh screen without damage to the aluminum. Fine powder flakes are redissolved and reprocessed.

The powder metallic paint is sprayed electrostatically onto steel panels which are baked at a horizontal and vertical position. The brightness, color development and gloss of the horizontally and vertically baked panels are indistinguishable to the human eye. In addition, the vertically baked panels do not show "reverse flop".

EXAMPLE 2

The procedure of Example 1 is repeated except for the difference that a functionally equivalent amount of polyazelaic anhydride is substituted for the carboxy-terminated polymer of Example 1. The liquid paint dispersion is converted to metallic powder paint as described in Example 1. The metallic powder paint is electrostatically sprayed onto steel panels and baked thereon as in Example 1. The resultant cured coatings are of the same quality as that obtained in Example 1.

EXAMPLE 3

A liquid metallic paint dispersion containing 45% by weight solids is prepared according to the procedure described in Example 1. The liquid paint is added dropwise to the surface of the moving stream of tap water. The drops spread poorly yielding small thick disc-like films containing aluminum flakes in random orientation. A powder metallic coating obtained from the flakes is applied electrostatically to steel panels and baked horizontally and vertically. The difference in brightness and color development of the horizontally and vertically baked panels is pronounced. In addition, the vertically baked panels show "reverse flop". This procedure is repeated with two differences. The average molecular weight of the epoxy-functional copolymer is about 2000 and the concentration of solids in the paint dispersion is reduced to 39–40 weight percent. The drops spread at an adequate rate and provide plate-like solids of desirable thickness.

EXAMPLE 4

The last described procedure in Example 3 is repeated except that a paint solution containing 10% by weight solids is used. Upon contact with the water surface the drops spread rapidly and disintegrate into small fragments. Resinfree pigments and aluminum flakes are suspended in the water. The product is of poor quality as a metallic powder coating. This procedure is repeated with two differences. The average molecular weight of the epoxy-functional copolymer is about 7500 and the concentration of solids in the paint dispersion is increased to about 15 weight percent. The drops spread at an adequate rate and provide plate-like solids of desirable thickness.

EXAMPLE 5

A liquid metallic paint dispersion is prepared as in Example 1 and sprayed onto the surface of a falling water curtain which is collected in a holding tank. Upon contact with the water surface, the sprayed paint drops spread and form disc-like films which are processed as in Example 1 to give powder metallic paint. The powder is of the same quality as that of Example 1.

EXAMPLE 6

A liquid metallic paint is prepared as in Example 1. The paint contains 50% by weight of aluminum flakes based on weight of resinous film-former. This paint is processed as described in Example 1 to yield aluminum flakes coated with a thin layer of paint binder.

EXAMPLE 7

A liquid metallic paint is prepared according to the procedure described in Example 2. Water is spread on a moving rubber belt which leads to a holding tank. The thickness of the water layer on the belt is maintained at about 1/8 inch. The liquid paint is sprayed onto the surface of the water to effect spreading and extraction of solvent. The formed solid paint films are transported by the belt to the holding tank and processed as described in Example 1. The quality of the coated aluminum flakes is as good as those in Example 2.

EXAMPLE 8

A liquid metallic paint is prepared according to the procedure described in Example 1. Tap water is placed in a holding tank. A rotating steel roll is partially immersed in the water solution. Because of its continuous rotation the surface of the roll is covered with a thin layer of water solution. The liquid paint is sprayed onto the surface of the wet roll to effect spreading and extraction of the solvent. The formed solid paint film is removed from the roll by a stationary blade adjacent to the surface of the roll, and thereon processed as described in Example 1.

EXAMPLE 9

The procedure of Examples 1 and 2 are repeated except that the liquid paint dispersion contains 2% by weight aluminum flakes which pass 270 mesh screen and 1% by weight nickel flakes which pass 325 mesh screen.

EXAMPLE 10

The procedure of Examples 1 and 2 are repeated except that the liquid paint dispersion contains 5% by weight stainless steel flakes which pass 270 mesh screen.

EXAMPLE 11

The procedure of Examples 1 and 2 are repeated except that the liquid paint dispersion contains 4% by weight copper flakes which pass 270 mesh screen.

EXAMPLE 12

The procedure of Examples 1 and 2 are repeated except that the liquid paint dispersion contains 3% by weight brass flakes which pass 270 mesh screen.

The term "dispersion" is used herein to include both partial and complete solutions.

Many modifications of the foregoing illustrative examples will be apparent to those skilled in the art in view of this specification. It is intended that all such modifications which fall within the scope of this invention be included within the appended claims.

Any and all disclosures appearing in the attached claims and not specifically appearing in the body of this specification are herewith incorporated in the body of the specification.

I claim:

1. A process for producing powder paint particles from a liquid dispersion of organic paint components in an organic solvent which comprises:
   1. depositing upon the surface of a stream of water in continuous movement through a spreading and extraction zone without strong agitation at the point of initial contact, a liquid dispersion of resin-comprising organic paint components in an organic solvent that is miscible with water, has surface tension in the range of about 20 to about 40 dynes/cm. and contains between 10 and 40 weight percent paint components which will float together on and are less than 5 weight percent soluble in water, said resin having average molecular weight in the range of about 1500 to about 15,000,
   2. maintaining the resultant floating deposit of paint dispersion in said spreading and extraction zone for a time sufficient to admit of
      A. spreading of said dispersion in contact with said stream of water upon the surface of said stream,
      B. extraction of at least 90 weight percent of said organic solvent from said dispersion of organic paint components floating upon the surface of said stream of water into said stream of water, and
      C. solidification of said organic paint components on said surface into plate-like solids,
   3. breaking said plate-like solids into smaller particles after said plate-like solids have passed from said spreading and extraction zone into a collection zone, and
   4. recovering said smaller particles from said collection zone.

2. A process in accordance with claim 1 wherein said dispersion of organic paint components contains at least two particulate pigments at least one of which is metal flakes that will pass through a 270 mesh screen and at least one of which is non-metal.

3. A process in accordance with claim 1 wherein said resin has average molecular weight in the range of about 1500 to about 15,000 and said particles recovered from said collection zone have average thickness of less than 15 microns and are subsequently pulverized to form flakes having both length and width in the range of about 5 to about 140 microns and thickness not greater than one-fifth of the lesser of said length and said width.

4. A process for producing powder paint particles from a liquid dispersion of organic paint components which comprises:
   1. depositing upon the surface of a stream of water in continuous movement through a spreading and extraction zone without strong agitation at the point of intitial contact discrete droplets of a liquid dispersion of resin-comprising organic paint components in an organic solvent that is miscible with water, has surface tension in the range of about 20 to about 40 dynes/cm. and contains between 15 and 35 weight percent paint components which will float together on and are less than 5 weight percent soluble in water, said resin having average molecular weight in the range of about 1500 to about 15,000, 2. maintaining the resultant floating droplets of said liquid dispersion in said spreading and extraction zone for a time sufficient to admit of
   A. spreading of said floating droplets upon the surface of said stream,
   B. extraction of at least 90 weight percent of said organic solvent from said floating droplets into said water, and
   C. solidification of said paint components of said droplets on said surface into plate-like solids,
3. breaking said plate-like solids into smaller particles after said plate-like solids have passed from said spreading and extraction zone into a collection zone by agitating said water in said collection zone, and
4. recovering said smaller particles from said collection zone.

5. A process for producing powder paint particles containing metal flakes from a liquid paint dispersion containing said metal flakes which comprises:
   1. depositing upon the surface of a stream of water in continuous movement through a spreading and extraction zone without strong agitation at the point of initial contact discrete droplets of a liquid dispersion of resin-comprising organic paint components and metal flakes that will pass through a 270 mesh screen in an organic solvent that is miscible with water has surface tension in the range of about 20 to about 40 dynes/cm. and contains between 15 and 35 weight percent paint components which together will float on an area less than 5 percent soluble in water, said resin having average molecular weight in the range of about 1500 to about 15,000,
   2. maintaining the resultant floating droplets of said liquid dispersion in said spreading and extraction zone for a time sufficient to admit of
      A. spreading of said floating droplets upon the surface of said stream,
      B. extraction of at least 90 weight percent of said organic solvent from said floating droplets into said water, and
      C. solidification of said paint components of said droplets on said surface into plate-like solids having average thickness of less than 15 microns,
   3. breaking said plate-like solids into smaller particles after said plate-like solids have passed from said spreading and extraction zone into a collection zone by agitating said water in said collection zone, and
   4. recovering said smaller particles from said collection zone and pulverizing said smaller particles into flakes containing said metal flakes having both length and width in the range of about 5 to about 140 microns and thickness not greater than one-fifth of the lesser of said length and width.

* * * * *